(12) United States Patent
Yoshida et al.

(10) Patent No.: US 9,197,153 B2
(45) Date of Patent: Nov. 24, 2015

(54) POWER TOOL HAVING DISPLAY THAT DISPLAYS RESIDUAL CAPACITY OF BATTERY

(71) Applicant: HITACHI KOKI CO., LTD., Tokyo (JP)

(72) Inventors: Kenichirou Yoshida, Hitachinaka (JP); Hideyuki Tanimoto, Hitachinaka (JP); Hayato Yamaguchi, Hitachinaka (JP); Shinji Kuragano, Hitachinaka (JP); Takuya Konnai, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 60 days.

(21) Appl. No.: 13/947,992

(22) Filed: Jul. 22, 2013

(65) Prior Publication Data

US 2014/0028223 A1    Jan. 30, 2014

(30) Foreign Application Priority Data

Jul. 30, 2012    (JP) ................................. 2012-168141

(51) Int. Cl.

| G05B 11/28 | (2006.01) |
|---|---|
| H02J 7/14 | (2006.01) |
| H02P 27/00 | (2006.01) |
| B25F 5/00 | (2006.01) |
| H02J 7/00 | (2006.01) |

(52) U.S. Cl.
CPC . *H02P 27/00* (2013.01); *B25F 5/00* (2013.01); *H02J 7/0047* (2013.01); *H02J 7/0063* (2013.01); *H02J 2007/005* (2013.01)

(58) Field of Classification Search
USPC ............ 318/599, 430, 432; 320/114; 388/937
See application file for complete search history.

(56) References Cited

U.S. PATENT DOCUMENTS

| 6,424,112 B1* | 7/2002 | Schauer ........................ 318/599 |
|---|---|---|
| 2001/0000552 A1* | 5/2001 | Watson .......................... 30/375 |
| 2006/0220612 A1* | 10/2006 | Feldmann et al. ............ 320/114 |
| 2009/0102420 A1* | 4/2009 | Uehlein-Proctor et al. .. 320/114 |

FOREIGN PATENT DOCUMENTS

JP         2009072892 A    4/2009

* cited by examiner

*Primary Examiner* — Paul Ip
*Assistant Examiner* — Devon Joseph
(74) *Attorney, Agent, or Firm* — Kilpatrick Townsend & Stockton LLP

(57) ABSTRACT

A power tool includes a housing, an electric motor accommodated in the housing, a secondary battery that supplies electric power to the electric motor, a handle provided at the housing, a trigger switch provided at the handle for controlling electric power supply to the electric motor, a residual capacity display for displaying a residual capacity of the secondary battery, and a lock-release switch provided at the handle and configured to allow the trigger switch to be operable and to start displaying the residual capacity at the residual capacity display upon manipulation to the lock-release switch.

7 Claims, 6 Drawing Sheets

POWER TOOL HAVING DISPLAY THAT DISPLAYS RESIDUAL CAPACITY OF BATTERY

CROSS REFERENCE TO RELATED APPLICATION

This application claims priority from Japanese Patent Application No. 2012-168141 filed Jul. 30, 2012. The entire content of the priority application is incorporated herein by reference.

TECHNICAL FIELD

The present invention relates to a power tool driven by a secondary battery as a power source, and more particularly, to such a power tool provided with a display portion for displaying a residual capacity of the secondary battery.

BACKGROUND

A power tool driven by a secondary battery and provided with a display portion for displaying a residual capacity of the secondary battery has been proposed. For example, Japanese Patent Application Publication No. 2009-72892 discloses a power tool provided with a display portion and a display switch positioned beside the display portion. The display portion is provided by a light emitting element such as an LED. Upon pressing the display switch, the residual capacity of the secondary battery is displayed at the display portion.

SUMMARY

However, according to such a conventional power tool, the display switch is pressed by one hand of a user, while a handle of the power tool is gripped by another hand of the user for holding the power tool. That is, both hands are used for an operation to display the residual capacity of the battery at the display portion, which is cumbersome.

In view of the foregoing, it is an object of the present invention to provide a power tool capable of displaying a residual capacity of the secondary battery with simple operation.

In order to attain the above and other objects, the present invention provides a power tool including: a housing; an electric motor; a secondary battery; a handle; a trigger switch; a residual capacity display; and a lock-release switch. The electric motor is accommodated in the housing. The secondary battery supplies electric power to the electric motor. The handle is provided at the housing. The trigger switch is provided at the handle for controlling electric power supply to the electric motor. The residual capacity display displays a residual capacity of the secondary battery. The lock-release switch is provided at the handle and configured to allow the trigger switch to be operable and to start displaying the residual capacity at the residual capacity display upon manipulation to the lock-release switch.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
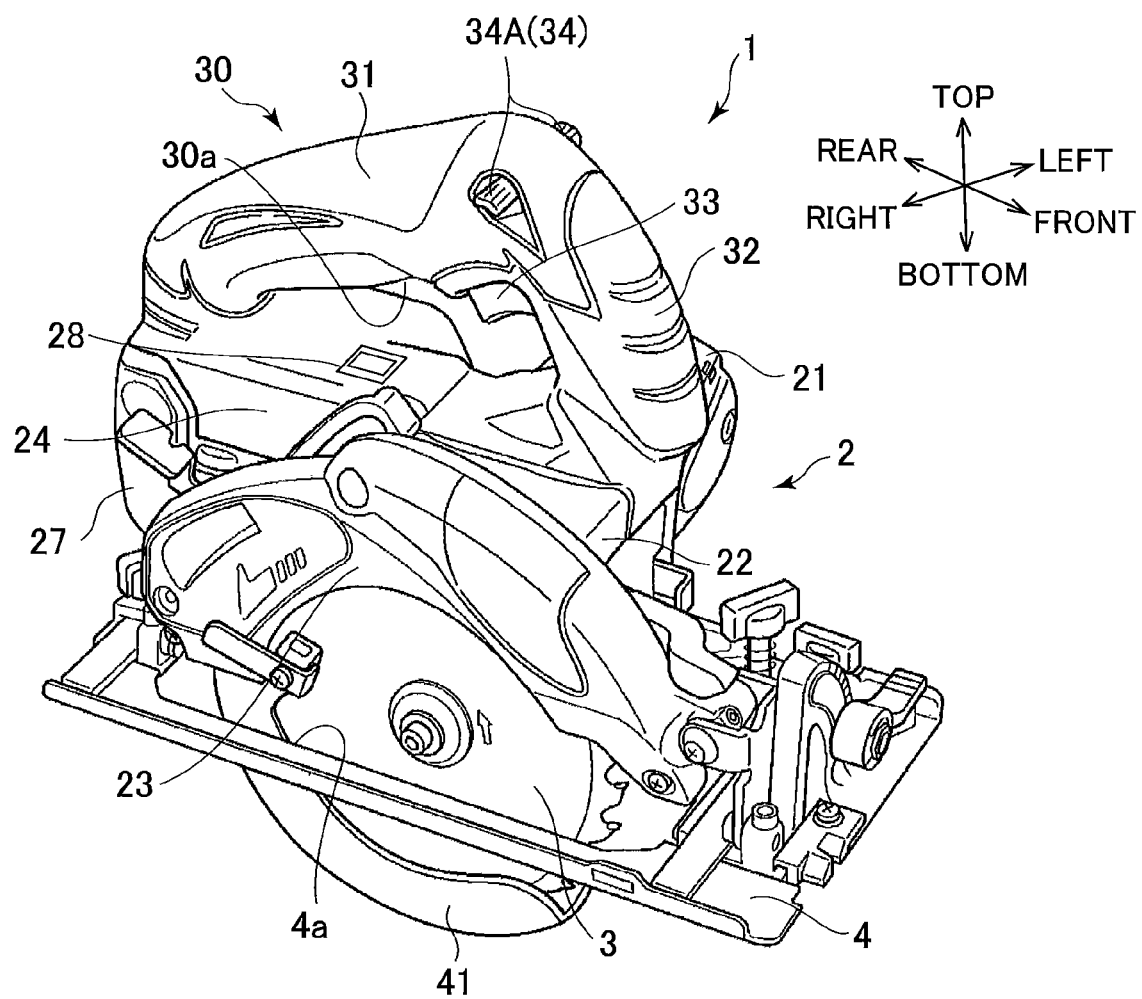
FIG. 1 is a perspective view of a portable circular saw according to one embodiment of the present invention.

A power tool according to one embodiment of the present invention will be described while referring to FIGS. 1 through 7 wherein like parts and components are designated by the same reference numerals to avoid duplicating description.

The embodiment pertains to a portable circular saw 1 including a housing 2, a circular saw blade 3, and a base 4.

Figure 2:
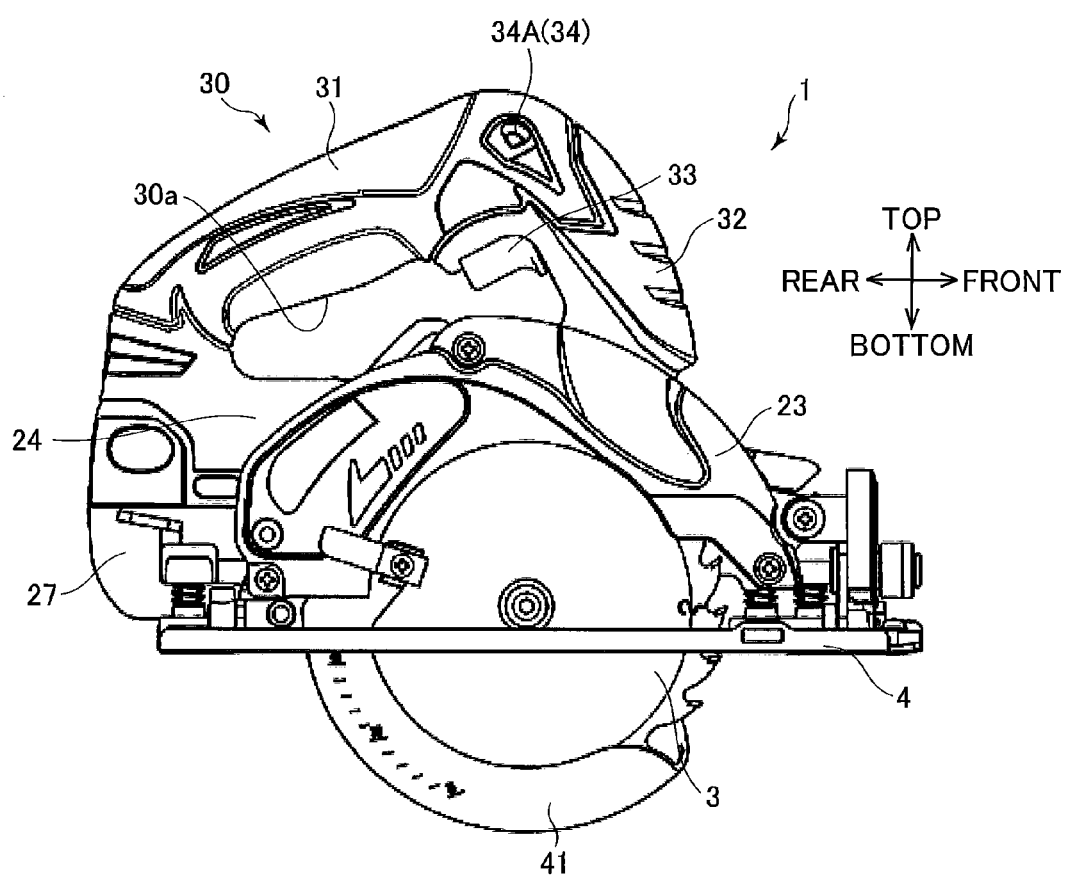
FIG. 2 is a side view of the portable circular saw according to the embodiment.

For convenience, in the following description, a right side and a left side of the circular saw 1 in FIG. 2 will be referred to as "front side" and "rear side", respectively, and a top side and a bottom side of the circular saw 1 in FIG. 2 will be referred to as "top side" and "bottom side". Further "right side" and "left side" are defined as shown in FIG. 1 when viewing from the rear side of the circular saw 1.

The housing 2 includes a motor housing 21 for accommodating an electric motor 25 (FIG. 3), a gear cover 22 for accommodating a gear mechanism 5 (FIG. 3), a saw cover 23 for accommodating the circular saw blade 3, and a battery accommodating portion 24 for accommodating a secondary battery 27.

Figure 3:
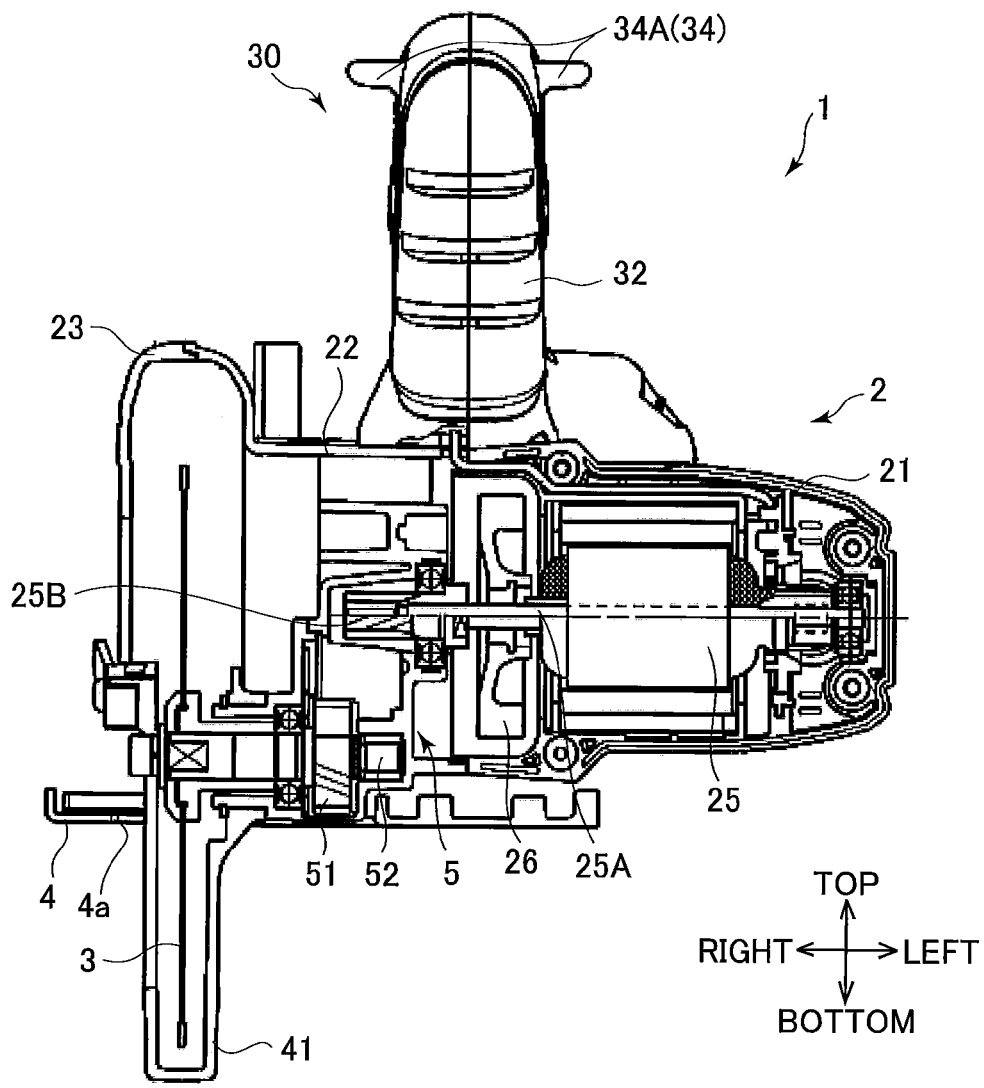
FIG. 3 is a partial cross-sectional view of the portable circular saw according to the embodiment.

The motor housing 21 is formed with an air intake port (not shown) which is open at a left side of the electric motor 25. As shown in FIG. 3, the electric motor 25 has an output shaft 25A extending in a rightward/leftward direction. A pinion gear 25B is fixed to a right end portion of the output shaft 25A. A fan 26 is fixed to the output shaft 25A and disposed at a left side of the pinion gear 25B. Upon rotation of the fan 26, an external air is introduced into an internal space of the motor housing 21 through the air intake port for cooling the electric motor 25.

The gear cover 22 is positioned rightward of the motor housing 21. The gear mechanism 5 is accommodated in the gear cover 22. The gear mechanism 5 includes a plurality of gears (not shown) and a final gear 51. Further, a transmission shaft 52 is rotatably supported to the saw cover 23, and the final gear 51 is fixed to the transmission shaft 52. Rotation of the pinion gear 25B is deceleratingly transmitted to the final gear 51 through the plurality of gears. The circular saw blade 3 is detachably attached to a right end portion of the transmission shaft 52. The circular saw blade 3 is coaxial with and integrally rotatable with the transmission shaft 52. Thus, an output of the electric motor 25 is transmitted to the circular saw blade 3 through the gear mechanism 5, so that the circular saw blade 3 rotates in a counterclockwise direction in FIG. 2.

The gear cover 22 is adapted to cover an upper half of the left side surface of the circular saw blade 3 as shown in FIGS. 1 and 3. The gear cover 22 is provided with an illumination device 23A (FIG. 7) such as an LED for illuminating a blade edge of the circular saw blade 3. The illumination device 23A is adapted to light in interlocking relation to an operation of a lock-release switch 34 described later.

The saw cover 23 is adapted to cover an upper half of the right side surface of the circular saw blade 3, and has a left side connected to the gear cover 22. A safety cover 41 is provided at a lower portion of the saw cover 23 for covering a part of the circular saw blade 3, the part being protruding downward from the base 4. The safety cover 41 is attached to the gear cover 22 and is pivotally movable relative to the gear cover 22 about a rotational center of the circular saw blade 3 along the blade edge thereof. A spring (not shown) is provided between the gear cover 22 and the safety cover 41 for urging the safety cover 41 in a rotational direction of the circular saw blade 3.

The battery accommodating portion 24 has a portion extending rearward from the motor housing 21 and the gear cover 22. The battery 27 for supplying electric power to the electric motor 25, etc. is detachably accommodated in a rear portion of the battery accommodating portion 24. Nickel-cadmium battery and lithium-ion battery are available as the battery 27. Further, a battery terminal 24A (FIG. 7) and a controller 29 (FIG. 7) are accommodated in the battery accommodating portion 24.

Figure 4:
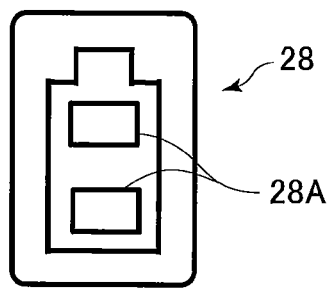
FIG. 4 is a view of a display portion for displaying a residual capacity of the secondary battery in the portable circular saw according to the embodiment.

A residual capacity display 28 is provided at an upper surface of the battery accommodating portion 24. As shown in FIG. 4, the residual capacity display 28 includes two light emitting elements 28A such as LEDs. The controller 29 controls light emission of the light emitting elements 28A in accordance with the residual capacity of the battery 27. More specifically, two light emitting elements 28A are lighted if the residual capacity is sufficient, one of the light emitting elements 28A is lighted if the residual capacity becomes a half of the full capacity, and two light emitting elements 28A are not lighted if the residual capacity is running out.

A handle 30 is provided at an upper side of the battery accommodating portion 24. The handle 30 includes a grip portion 31 and a connecting portion 32. The grip portion 31 extends frontward and diagonally upward from the rear end portion of the battery accommodating portion 24 so that a user can grip the grip portion 31. The connecting portion 32 extends frontward and diagonally downward from a front end of the grip portion 31 and is connected to the upper surface of the front portion of the battery accommodating portion 24. As shown in FIGS. 1 and 2, the handle 30 is provided to the battery accommodating portion 24 such that the handle 30 and the battery accommodating portion 24 form in combination an annular shape providing a grip space 30a opened rightward and leftward. A user operates the circular saw 1 by gripping the grip portion 31 with inserting his/her hand through the grip space 30a. The residual capacity display 28 is positioned to face the grip space 30a and below the grip portion 31. Thus, the residual capacity display 28 is positioned in confrontation with the grip portion 31.

Figure 5:
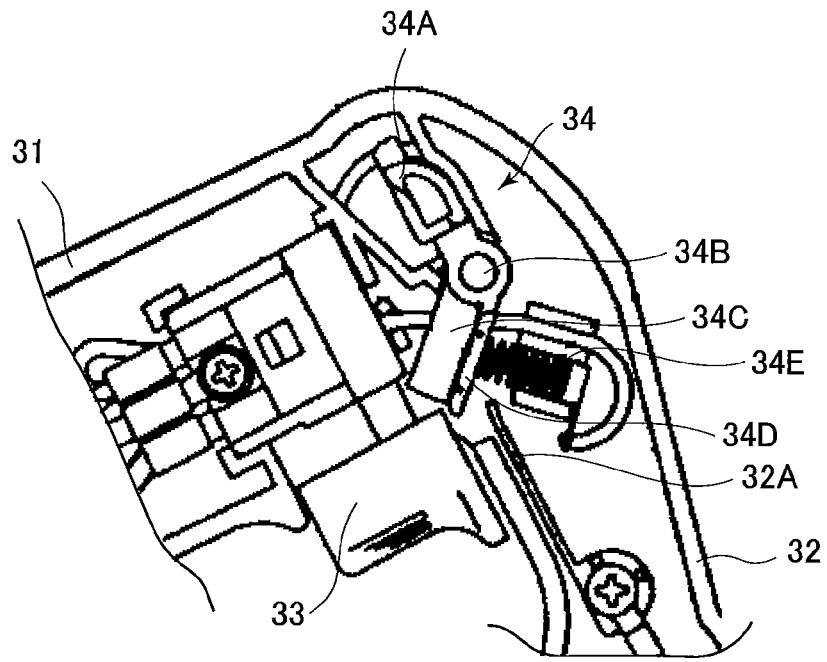
FIG. 5 is an enlarged view particularly showing a trigger switch and a lock-release switch of the portable circular saw according to the embodiment, the view showing a disengagement position of the lock-release switch.

A trigger switch 33 and the lock-release switch 34 are provided at the front end portion of the grip portion 31. The trigger switch 33 is adapted to control electric power supply to the electric motor 25. An off-lock switch is provided by the trigger switch 33 and the lock-release switch 34. The trigger switch 33 and the lock-release switch 34 are positioned such that these switches can be manipulated with a user's hand that grips the grip portion 31. As shown in FIG. 5, the lock-release switch 34 includes a manipulating portion 34A, a shaft portion 34B, an engagement portion 34C, a wiper contact 34D, and a spring 34E.

The manipulating portion 34A is a portion manipulated by a user. The manipulating portion 34A and the engagement portion 34C provide in combination a generally L-shaped cross-section, and are pivotally movable about the shaft portion 34B to one of a non-engagement position (OFF state) shown in FIG. 5 and an engagement position (ON state) shown in FIG. 6. The wiper contact 34D is provided at the engagement portion 34C. The spring 34E is positioned to contact the wiper contact 34D for urging the manipulating portion 34A and the engagement portion 34C to the non-engagement position.

When the manipulating portion 34A and the engagement portion 34C are positioned at the non-engagement position shown in FIG. 5, an end portion of the trigger switch 33 is brought into abutment with the engagement portion 34C when the trigger switch 33 is pulled. Therefore, the trigger switch 33 cannot be further pulled any more. In other words, the lock-release switch 34 is at its locking phase for locking a movement of the trigger switch 33 when the manipulating portion 34A and the engagement portion 34C are at the non-engagement position.

Figure 6:
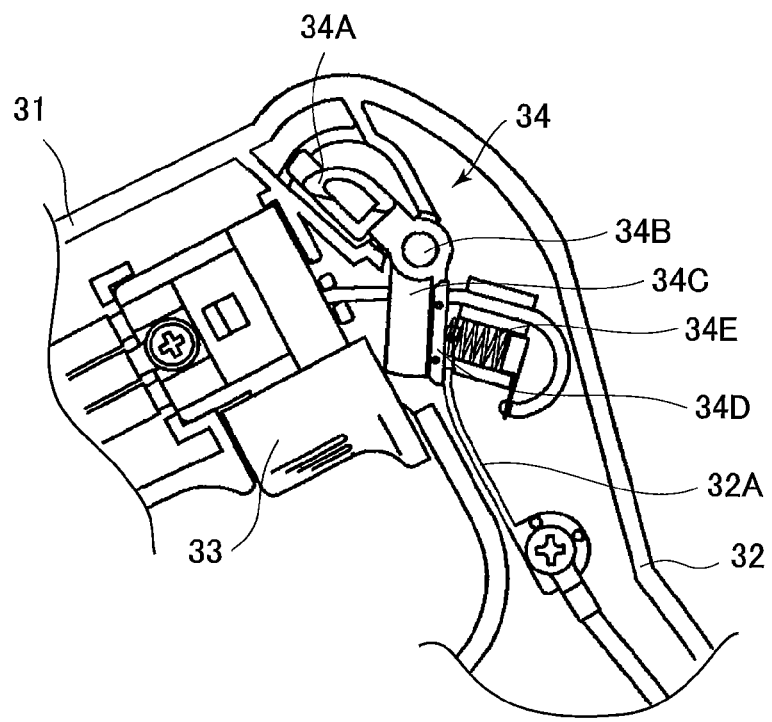
FIG. 6 is an enlarged view particularly showing the trigger switch and the lock-release switch of the portable circular saw according to the embodiment, the view showing an engagement position of the lock-release switch.

On the other hand, when the manipulating portion 34A and the engagement portion 34C are positioned at the engagement position shown in FIG. 6 as a result of pressing down the manipulating portion 34A, the engagement portion 34C is moved to a position so as not to interrupt the movement of the trigger switch 33. In other words, the lock-release switch 34 is at its release phase for releasing locking of the trigger switch 33. Thus, the trigger switch 33 becomes operable, so that the trigger switch 33 can be pulled to provide an ON state.

A fixed contact 32A is positioned in the connecting portion 32. When the manipulating portion 34A and the engagement portion 34C are positioned at the engagement position, the wiper contact 34D is in contact with the fixed contact 32A to provide the ON state where the illumination device 23A and the residual capacity display 28 are configured to be lighted. In this way, upon manipulation to the lock-release switch 34, the trigger switch 33 can be operated and the residual capacity of the battery 27 can be displayed at the residual capacity display 28.

Further, the display 28 is configured to be turned OFF (non-displaying state) upon pulling the trigger 33 in a state where the manipulating portion 34A and the engagement portion 34C are positioned at the engagement position and the display 28 is lighted.

Further, if the user stops pressing the manipulating portion 34A while the trigger switch 33 is being pulled, the manipulating portion 34A and the engagement portion 34C are urged to be moved toward the non-engagement position because of the urging force of the spring 34E. However, as shown in FIG. 6, because the engagement portion 34C is in abutment with the trigger switch 33 which is at the pulled state, the manipulating portion 34A and the engagement portion 34C cannot be returned to the non-engagement position. In this way, the ON state (release phase) of the lock-release switch 34 is maintained even if the user stops pressing the manipulating portion 34A in a state where the trigger switch 33 is being pulled.

As shown in FIG. 1, the base 4 is generally rectangular plate shaped and is positioned below the housing 2. The base 4 defines a longitudinal direction coincident with the frontward/rearward direction. An opening 4a extending in the longitudinal direction is formed at a substantially center portion of the base 4 for allowing the circular saw blade 3 and the safety cover 41 to be inserted through the opening 4a.

Next, control process to the circular saw 1 by way of the trigger switch 33 and the lock-release switch 34 will be described with reference to FIGS. 1 and 7. First, a user grips the grip portion 31 with his/her hand, and presses down the lock-release switch 34 with his/her finger of his/her hand gripping the grip portion 31, so that the wiper contact 34D is brought into contact with the fixed contact 32A to provide the ON state. Thus, electric current is supplied from the battery 27 to the illumination device 23A and the residual capacity display 28 through the battery terminal 24A for lighting the illumination device 23A and the residual capacity display 28. The battery terminal 24A is configured to transmit a signal to the controller 29, the signal being indicative of the residual capacity of the battery 27. Accordingly, the controller 29 transmits a signal to the residual capacity display 28 in accordance with the signal from the battery terminal 24A for controlling lighting of the light emitting portions 28A.

Figure 7:
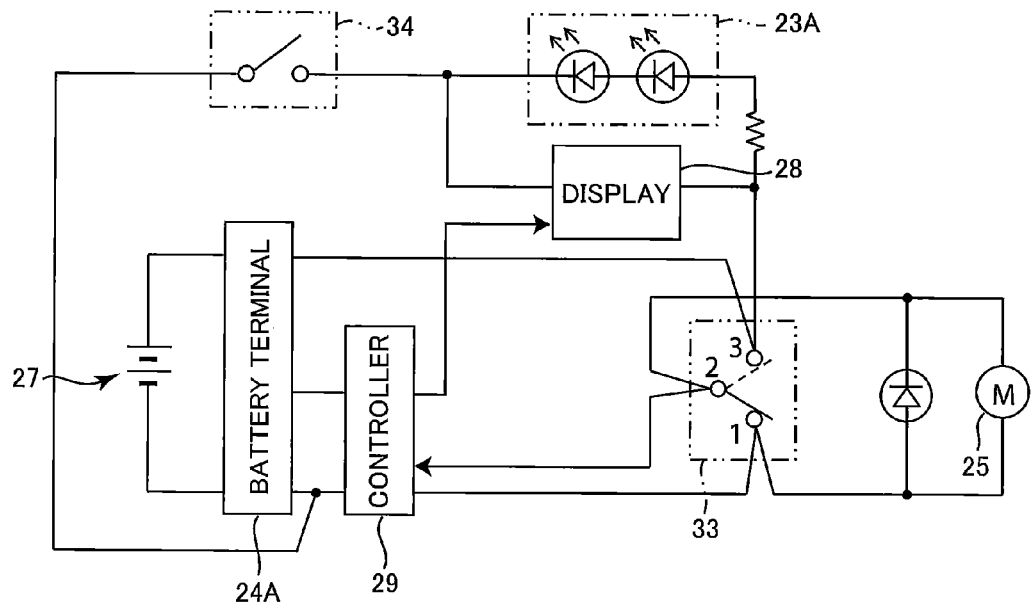
FIG. 7 is a circuit diagram in the portable circular saw according to the embodiment.

Next, the user pulls the trigger switch 33 so that the trigger switch 33 is switched from a position "1" to a position "3" in FIG. 7. Accordingly, electric current is supplied to the electric motor 25 for rotation. Further, switching of the trigger switch 33 from the position 1 to the position 3 is detected by the controller 29, so that the controller 29 stops electric power supply to the light emitting portions 28A of the residual capacity display 28. Thus, the residual capacity display 28 is turned OFF.

By rotating the electric motor 25, rotation of the output shaft 25A is transmitted to the circular saw blade 3 through the pinion gear 25B and the gear mechanism 5. In this state, the base 4 is in abutment with a workpiece for starting a cutting operation to the workpiece. During the cutting operation, a front end of the safety cover 41 is in abutment with the workpiece, so that the safety cover 41 is retracted into the saw cover 23. Upon completion of the cutting operation, the safety cover 41 is pivotally moved to the position shown in FIG. 2 by the urging force of the spring (not shown).

As described above, the residual capacity of the battery 27 is displayed at the residual capacity display 28 and the trigger switch 33 becomes operable by the operation of the lock-release switch 34. In this way, the residual capacity of the battery 27 can be displayed at the residual capacity display 28 only by the simple operation to the lock-release switch 34. Further, an increase in mechanical parts can be restrained because the lock-release switch 34 not only provides a function for making the trigger switch 33 operable but also provides a function for allowing the residual capacity display 28 to display the residual capacity of the secondary battery 27. Further, a driving operation of the electric motor 25 is not necessary for displaying the residual capacity of the battery 27. Therefore, wasteful consumption of the battery 27 and generation of noise caused by the rotation of the electric motor 25 can be avoided.

Further as described above, the handle 30 and the battery accommodating portion 24 provide the annular shape in combination, and the residual capacity display 28 is positioned in confrontation with the grip portion 31. Therefore, the residual capacity display 28 which is inherently subjected to breakage can be protected by the handle 30 while maintaining a certain level of visibility to the residual capacity display 28.

Further, the lock-release switch 34 is positioned to be accessible by a finger of the user's hand that grips the grip portion 31. Therefore, one-handed operation to the lock-release switch 34 can be performed, which facilitates display of the residual capacity of the battery 27 at the residual capacity display 28.

Further, the residual capacity display 28 is configured to be turned OFF upon pulling the trigger switch 33 while the residual capacity display 28 displays the residual capacity of the battery 27 by the operation to the lock-release switch 34. Therefore, the residual capacity of the battery 27 cannot be displayed at the residual capacity display 28 during the cutting operation. During the cutting operation, electrical voltage may be changed in accordance with a level of discharge current, so that the residual capacity of the battery 27 cannot be accurately displayed. If the residual capacity display 28 is still rendered ON during the cutting operation, the user may erroneously recognize the voltage drop during electric discharge as a decrease in residual capacity of the battery 27. In the present embodiment, since the residual capacity display 28 is turned OFF during the cutting operation, such mistaking understanding can be avoided, and a useless electric power consumption can be prevented.

Further, the ON state (release state) of the lock-release switch 34 can be maintained even if the user stops pressing the manipulating portion 34A while the trigger switch 33 is being pulled. Therefore, continuous pressing of the manipulating portion 34A during the cutting operation is not required, thereby enhancing operability of the circular saw blade 1.

Various modifications are conceivable.

For example, in the above-described embodiment, the residual capacity display 28 is configured to be turned OFF in response to the pulling operation of the trigger switch 33. Instead, the residual capacity display 28 is configured to be turned ON upon manipulation to the lock-release switch 34 and then turned OFF after elapse of a predetermined time period (for example, after 3 seconds). In the latter case also, erroneous recognition of the voltage drop as a decrease in residual capacity of the battery 27 can be eliminated, and a useless electric power consumption can be prevented.

Figure 8:
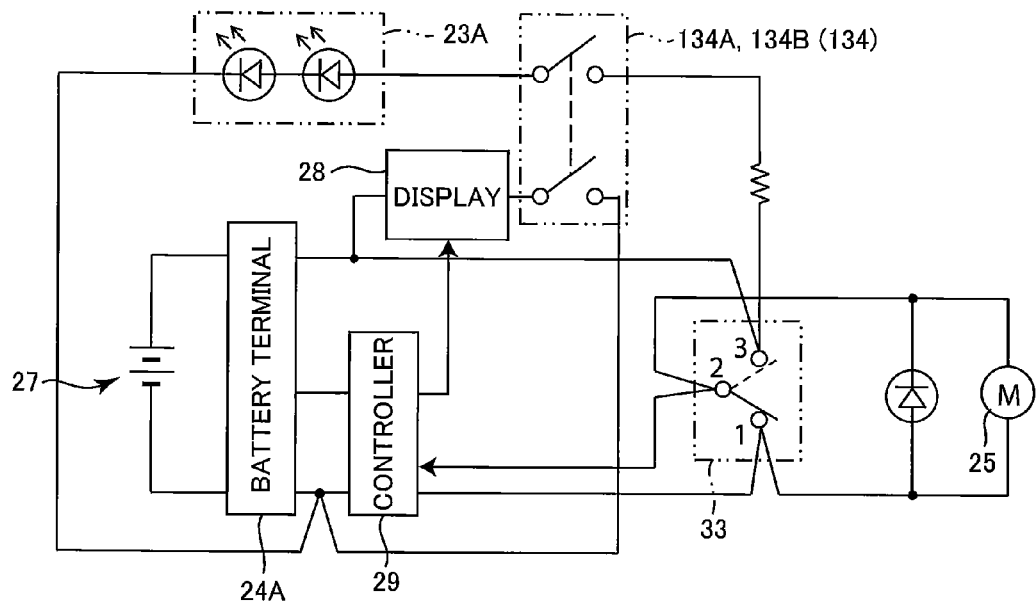
FIG. 8 shows a modification to the circuit diagram of FIG. 7.

In the above-described embodiment, a pair of contacts (the fixed contact 32A and the wiper contact 34D) is provided for the illumination device 23A and the residual capacity display 28 for performing ON/OFF control to the illumination device 23A and the residual capacity display 28. Instead of this structure, FIG. 8 shows a modification in which a pair of contacts 134A and another pair of contacts 134B are provided for the illumination device 23A and the residual capacity display 28, respectively. The two pairs of the contacts 134A and 134B are operated in interlocking relation to an off-lock switch 134 for performing ON/OFF control to the illumination device 23A and the residual capacity display 28.

Figure 9:
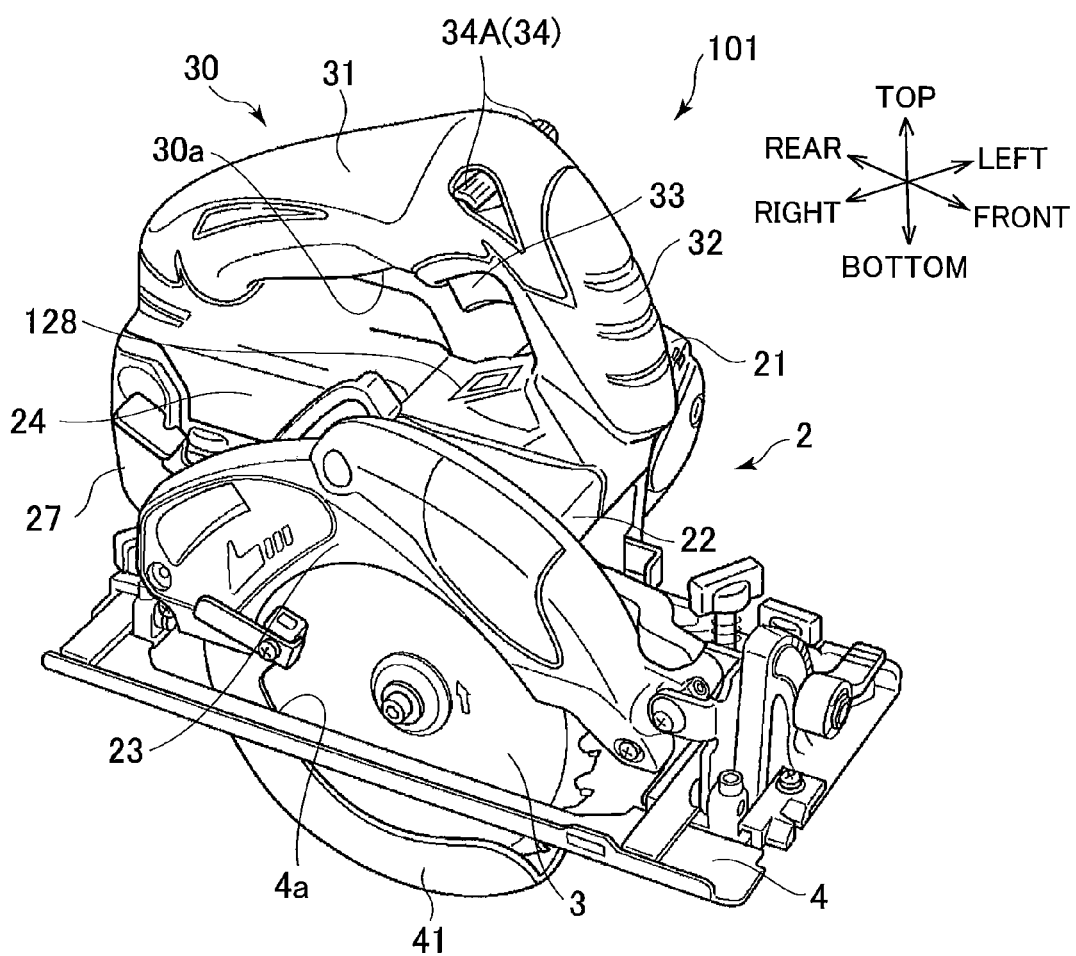
FIG. 9 is a perspective view of a portable circular saw according to a modified embodiment of the present invention.

Further, FIG. 9 shows a modified embodiment of a portable circular saw 101. According to the modification, a residual capacity display 128 is positioned on the battery accommodating portion 24 and in confrontation with the trigger switch 33 (immediately below the trigger switch 33). With this structure, the handle 30 can protect the fragile residual capacity display 128, while providing a certain level of visibility to the residual capacity display 128.

While the present invention has been described in detail with reference to the embodiment thereof, it would be apparent to those skilled in the art that various changes and modifications may be made therein without departing from the spirit of the present invention.

What is claimed is:

1. A power tool comprising:
   a housing;
   an electric motor accommodated in the housing;
   a battery that supplies electric power to the electric motor;
   a handle provided at the housing;
   a trigger switch provided at the handle for controlling electric power supply to the electric motor;
   a residual capacity display for displaying a residual capacity of the battery; and a lock-release switch provided at the handle, the lock-release switch being configured to provide a first state prohibiting the trigger switch from being operable and a second state allowing the trigger switch to be operable, the lock-release switch being configured to start displaying the residual capacity at the residual capacity display upon manipulation to the lock-release switch from the first state to the second state.

2. The power tool as claimed in claim 1, wherein the handle comprises a grip portion to be gripped by a user, and forms an annular shape in combination with the housing, the residual capacity display being provided at the housing at a position in confrontation with the grip portion.

3. The power tool as claimed in claim 2, wherein the trigger switch is provided at the grip portion, the residual capacity display being provided at the housing at a position in confrontation with the trigger switch.

4. The power tool as claimed in claim 1, wherein the handle comprises a grip portion to be gripped by a user, the lock-release switch being accessible for manipulation by a user's finger of a hand that grips the grip portion.

5. The power tool as claimed in claim 1, further comprising a controller configured to stop displaying the residual capacity at the residual capacity display upon manipulation to the trigger switch.

6. The power tool as claimed in claim 1, further comprising a controller configured to stop displaying the residual capacity at the residual capacity display after elapse of a predetermined time period starting from manipulation timing to the lock-release switch from the first state to the second state.

7. The power tool as claimed in claim 1, wherein the lock-release switch is configured to be engaged with the trigger switch to maintain the second state irrespective of manipulation to the lock-release switch as long as the trigger switch is manipulated for driving the electric motor.

* * * * *